Sept. 11, 1962 W. C. CAMPBELL 3,052,916
METHOD OF AND APPARATUS FOR MAKING PLASTIC ARTICLES
Filed March 4, 1960 7 Sheets-Sheet 3

INVENTOR.
WARD C. CAMPBELL
BY
ATTORNEYS

Sept. 11, 1962 W. C. CAMPBELL 3,052,916
METHOD OF AND APPARATUS FOR MAKING PLASTIC ARTICLES
Filed March 4, 1960 7 Sheets-Sheet 4

INVENTOR.
WARD C. CAMPBELL
BY J. Ralph Hoge &
W. A. Schaich
ATTORNEYS

Sept. 11, 1962 W. C. CAMPBELL 3,052,916
METHOD OF AND APPARATUS FOR MAKING PLASTIC ARTICLES
Filed March 4, 1960 7 Sheets-Sheet 6

INVENTOR.
WARD C. CAMPBELL
BY J. Ralph Hoge &
W. A. Schaich
ATTORNEYS

Sept. 11, 1962  W. C. CAMPBELL  3,052,916
METHOD OF AND APPARATUS FOR MAKING PLASTIC ARTICLES
Filed March 4, 1960  7 Sheets-Sheet 7

INVENTOR.
WARD C. CAMPBELL
BY
ATTORNEYS

United States Patent Office 3,052,916
Patented Sept. 11, 1962

3,052,916
METHOD OF AND APPARATUS FOR MAKING PLASTIC ARTICLES
Ward C. Campbell, Glassboro, N.J., assignor to Owens-Illinois Glass Company, a corporation of Ohio
Filed Mar. 4, 1960, Ser. No. 12,722
8 Claims. (Cl. 18—5)

The present invention relates to an improved method of and apparatus for making plastic articles and more particularly to a method and apparatus for blow-molding articles from a tube of heat-softened plastic material and for removing such articles from a blow-molding machine.

In the co-pending application of Richard C. Allen and Leon E. Elphee, Serial No. 797,276 filed in U.S. Patent Office March 4, 1959, now Patent No. 3,008,192, and assigned to the assignee of the present invention, there is disclosed a plastic forming machine for making articles by a combined injection-molding, tube-extruding, and blow-molding technique. Stated generally, the process and machine operations involve the injection molding of a finished portion of an article, for example, the neck or finish of a container, the extrusion of an elongated tubular formation integral with the injection-molded portion, the closure of separable blow-mold sections onto the extruded tube to pinch the tube shut in spaced relation to an extrusion orifice, and blowing the tube within the blowmold sections to its final finished configuration. After blow-molding, the separable mold sections are opened and a take-out device is inserted between the opened blow-mold sections to remove the finished article from the machine.

The finished article is retained at one end by the injection mold and at the other end by waste material joining the blown article portion to the extrusion orifice. Insertion of the take-out in the Allen et al. application severs the waste portion from the orifice so that the article subsequently removed by the take-out device has attached thereto and integrally formed therewith the non-blown waste portion, which portion must be subsequently removed in a separate operation. This removal requires additional operational steps and the utilization of additional apparatus, including the handling of the blown article to and from this removal apparatus and the actual severing of the finished article from the waste portion.

The present invention provides a specific and meritorious improvement over the device disclosed in the above-identified Allen and Elphee application. Specifically, the present invention provides an apparatus and method whereby that waste portion joining the blown portion of the article to the orifice at the conclusion of the blowing operation is removed from the article prior to removal of the article from the forming apparatus. Thus, no additional handling or severing steps are required once the article is removed from the apparatus, and the article, when removed from the forming apparatus, is complete and ready for immediate printing, filling, or other further processing steps.

To accomplish this improvement, the method and apparatus of the present invention proposes utilizing the separable blow-mold sections to substantially completely sever the tube from the waste portion upon closure of the blow-mold sections followed by movement of the finished article relative to the orifice after opening of the blow-molds to rupture or sever the blown article from the waste portion, which remains attached to the material filling the extrusion orifice.

It is, therefore, an important object of the present invention to provide an improved method and apparatus for making a plastic article blow-molded from a tube of heat-softened plastic material.

Another important object of this invention is the provision of an improved method and apparatus for forming a complete plastic article which is at least partially blow-molded from an extruded heat-softened tube and removing the article from the forming apparatus without any subsequently removable waste or joining portions integral therewith.

It is a further object to provide an apparatus for making plastic articles including a blow-mold adapted to pinch and substantially completely sever an extruded tube in spaced relation to an orifice through which the tube was extruded.

Yet another important object is the provision of an improved method of making a plastic article which is at least partially blow-molded from an extruded tube by simultaneously pinching the tube shut in spaced relation to an extrusion orifice and substantially severing the tube from a waste portion joining the tube to the orifice, blow-molding the article and then moving the article relative to the orifice so as to rupture the article completely from the waste portion.

Other and further objects of this invention will become apparent from the following description.

Figure 1:
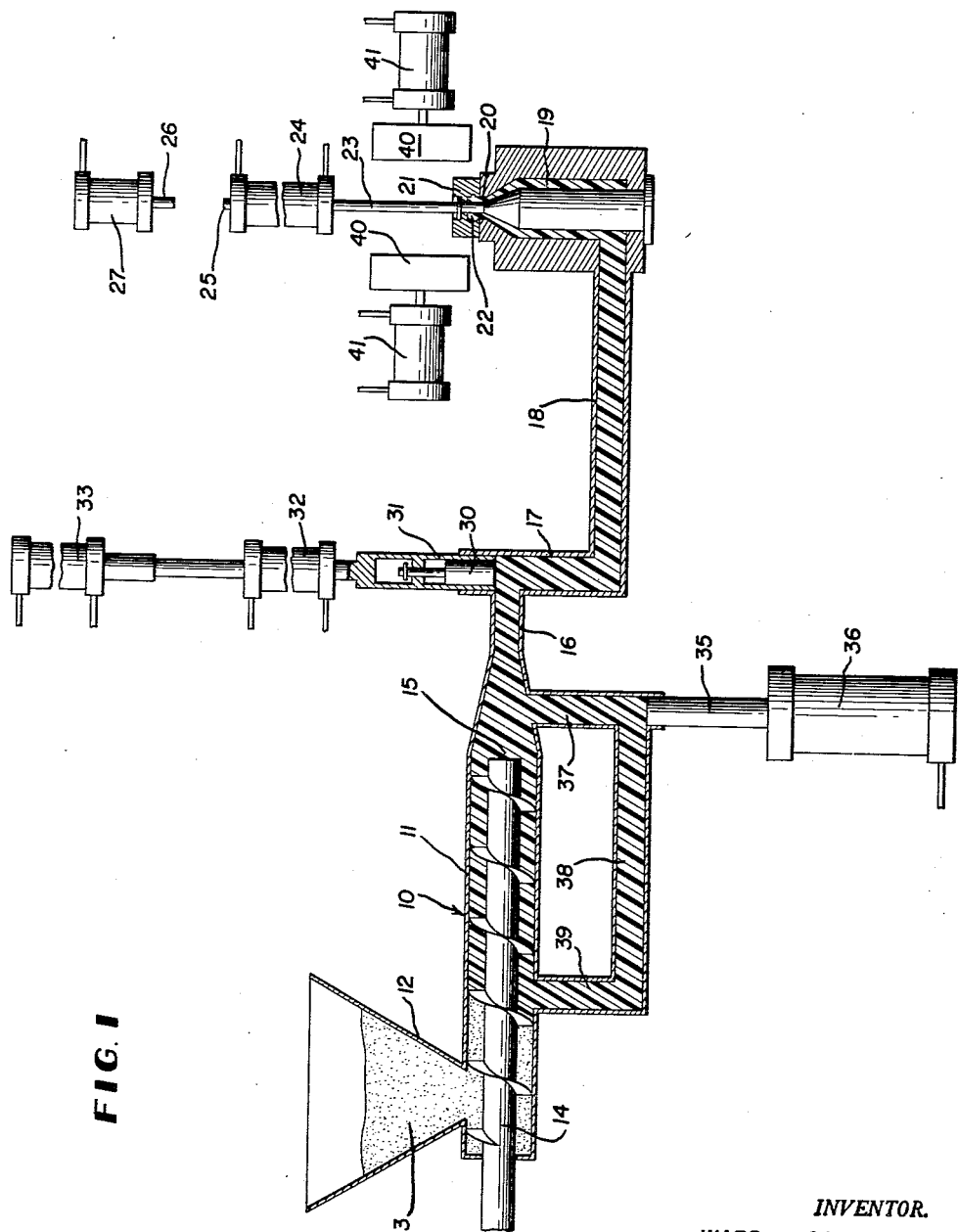
FIGURE 1 is a diagrammatic view illustrating schematically the plastic forming machine and apparatus and method of the present invention.

In FIGURE 1, reference numeral 10 refers generally to an extruder including a barrel 11 receiving from a hopper 12 granulated thermoplastic material 13 to be advanced within the barrel 11 by means of a power-driven screw 14. The outlet end 15 of the screw communicates through conduits 16, 17 and 18 with an orifice chamber 19 underlying an annular orifice 20 through which plastic material plasticized by the screw 14 is expressed. Overlying the orifice 20 is an injection mold 21 having an interior cavity 22 within which material expressed through the orifice 20 can be injection-molded to a final configuration. The injection mold 21 is carried by the actuating rod 23 of a power actuated cylinder 24, the cylinder 24 being double acting and having its rod 23 projecting thereabove, as at 25, for abutment with the actuating rod 26 of a stop cylinder 27 adapted to limit vertical movement of the injection mold 21 upon upward actuation of the cylinder 24.

To fill the cavity 22 at the desired pressure, an injection piston 30 is provided for slideable displacement within a sleeve valve 31 enterable into the conduit 17. The sleeve and piston are actuated into the conduit 17 to interrupt communication between the extruder outlet end 15 and the orifice 20 during injection molding, and to apply injection molding pressure directly to material filling conduits 17 and 18 by means of pressure supplied by double actuating cylinders 32 and 33. To aid in controlling operation of the extruder 10 a recirculation piston 35 is provided to be actuated by a cylinder 36. The cylinder 36 primarily controls the circulation of the output of the extruder 10 through recirculation conduits 37, 38, and 39 establishing a by-pass for plasticized material from the outlet end 15 of the screw 14 to a medial portion of the extruder barrel 11 at which material advanced by the screw is fluid.

Following the injection of plasticized material through the orifice 20 into the injection mold 21, the valve 31 and the piston 30 are retracted from the conduit 17, and the injection mold 21 is elevated by means of its cylinder 24. At this time, output material from the extruder 10 will flow through passages 16, 17 and 18 and orifice chamber 19 through the orifice 20 to be extruded through as a tubular extension integral with material filling the neck mold cavity 22. Also at this time, piston 35 can be actuated upwardly in the passage 37 to supplement the output of the extruder with plasticized material filling the passage 37.

Following extrusion of the tubular extension, the sleeve valve 31 alone is actuated into the conduit 17 to shut off the flow of material from the extruder to the orifice chamber 19. The pressure of fluid against the forward face of the recirculation piston 35 forces the piston 35 downwardly out of the passage 37 and accommodating interconnection of the passage 37 with the other recirculation passages 38 and 39. Thus, material output from the extruder is recirculated through the recirculation passages, and the extruder can run continuously even though it is disconnected from the orifice 20.

Also, after extrusion of the tube, blow-molds 40 are actuated by their cylinders 41 into closed relation, and the complementary blow-molds enclosing the tubular extension and air being introduced through the core of the injection mold 21 to expand the tube pinched shut by the blow-molds 40 in spaced relation to the orifice 20 to the configuration of the cavity defined by the blow-molds.

This operation is substantially that disclosed in the above-identified co-pending application, Serial No. 797,276 of R. C. Allen and L. E. Elphee.

Figure 2:
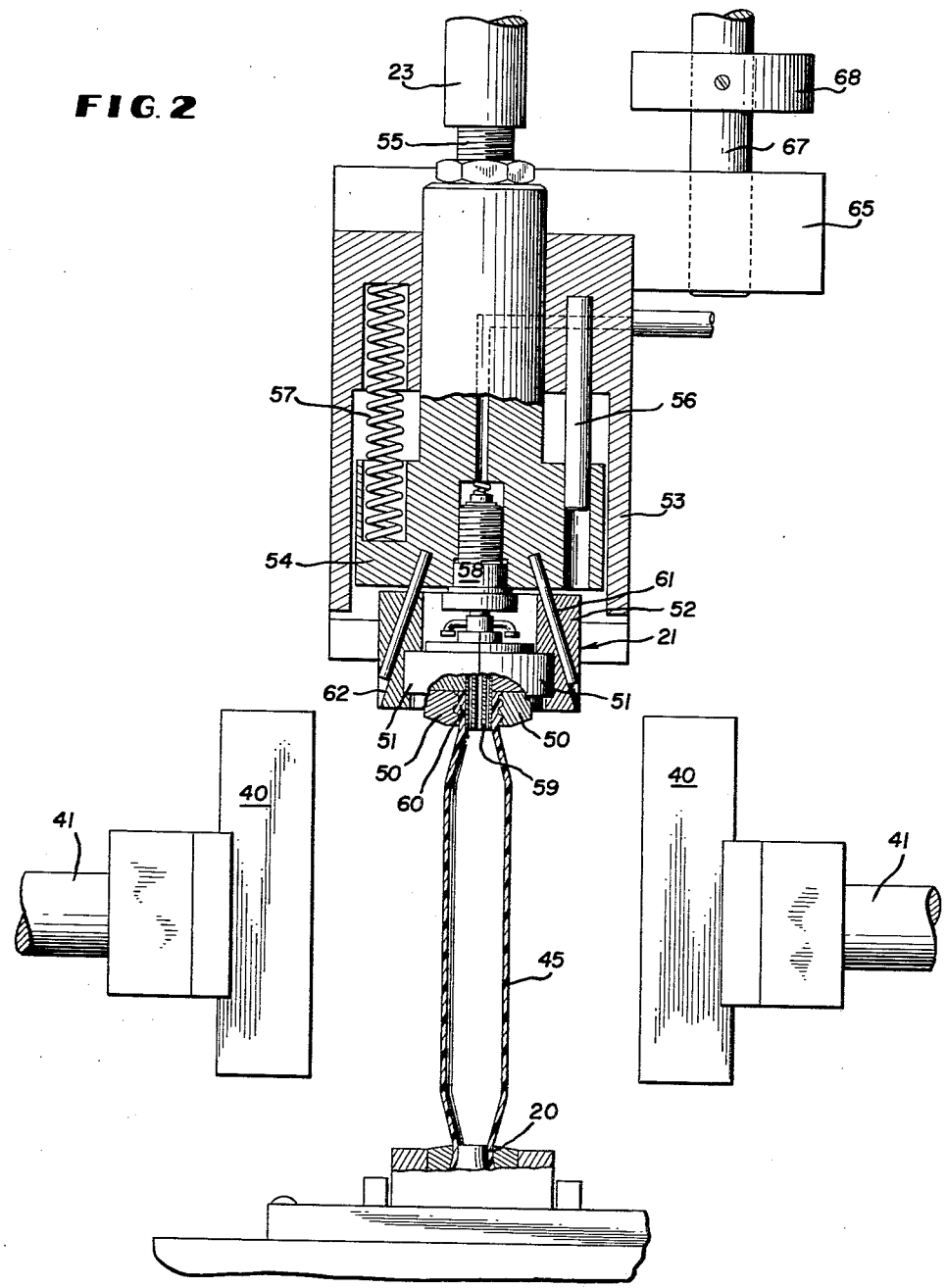
FIGURE 2 is an enlarged fragmentary sectional view of a portion of the apparatus of the present invention illustrating an injection mold, a separable blow mold, and an extruded tube joined to material filling an extrusion orifice and integral with material filling the injection mold.
Figure 3:
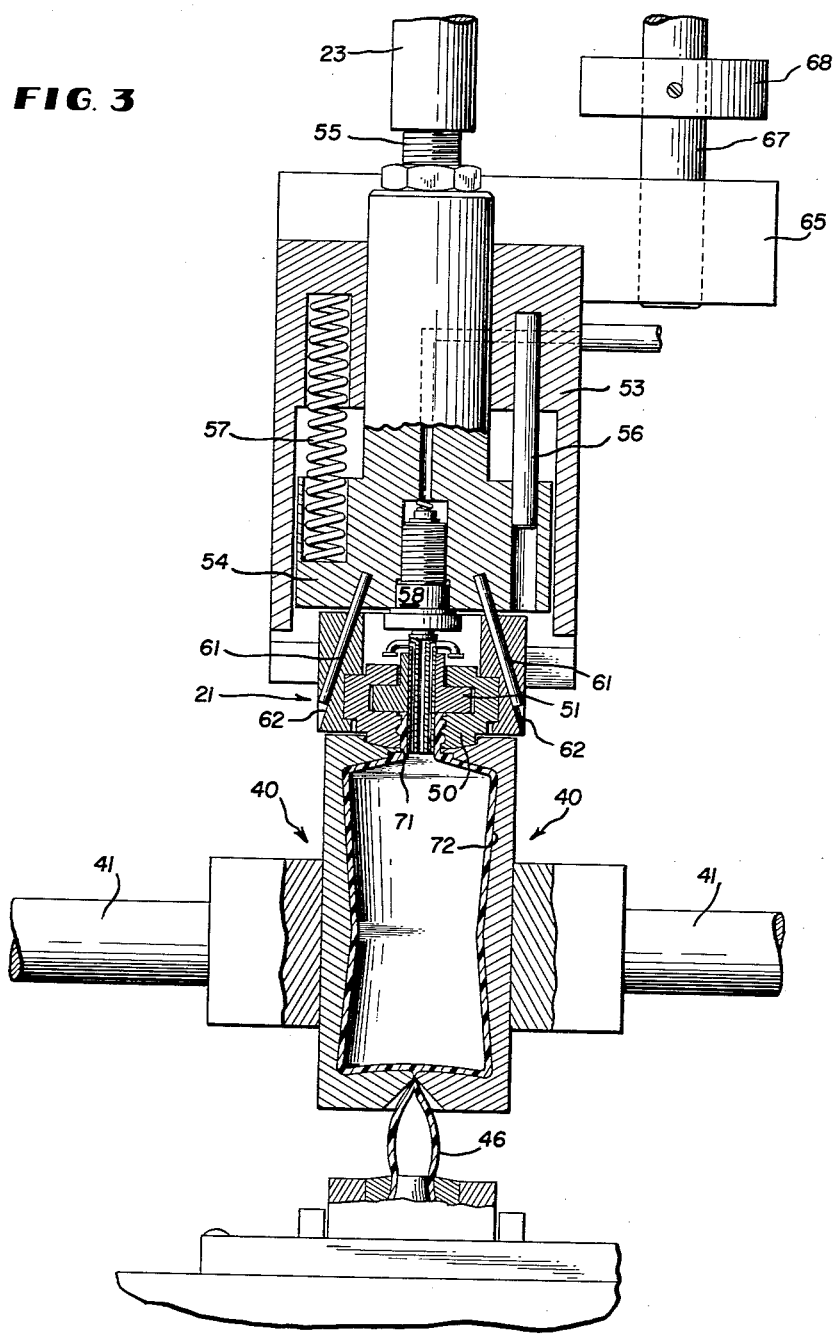
FIGURE 3 is a view similar to Figure 2 showing the blow molds in closed position, thereby pinching the tube and substantially severing the same, the tube being blown to its final configuration.

In FIGURE 2 of the drawings, the injection mold 21 is illustrated in detail, and it will be seen that this mold comprises a pair of complementary relatively laterally openable mold sections 50, each retained by a carrier block 51 movable with laterally spaced slideable blocks 52. The slide blocks 52 are carried for lateral sliding movement in a carrier frame 53. This carrier frame 53 carries for relative vertical movement a carrier block 54 threadedly attached, as at 55, to the actuating rod 23 of the neck mold cylinder 24. Relative movement of the block 54 within the frame 53 is guided by a vertical guide pin 56, and the block 54 is urged to its lower position relative to the frame by compression spring 57 interposed therebetween. The block 54 carries a threaded insert 58 movable with the block and carrying at its lower end an injection mold core 59 cooperating with the mold sections 50 to define an annular injection mold cavity 60 conforming to a finished portion of the article. In the illustrated embodiment of the invention, the article being made as a container and the injection mold cavity 60 define the neck or finish of the container. The neck mold sections 50 carried by the slideable blocks 52 are actuated for lateral outward separating movement (compare FIGURES 2 and 5) by inclined cam pins 61 fixed to the block 54 and laterally slideable in inclined recesses 62 formed in the blocks 52.

Figure 5:
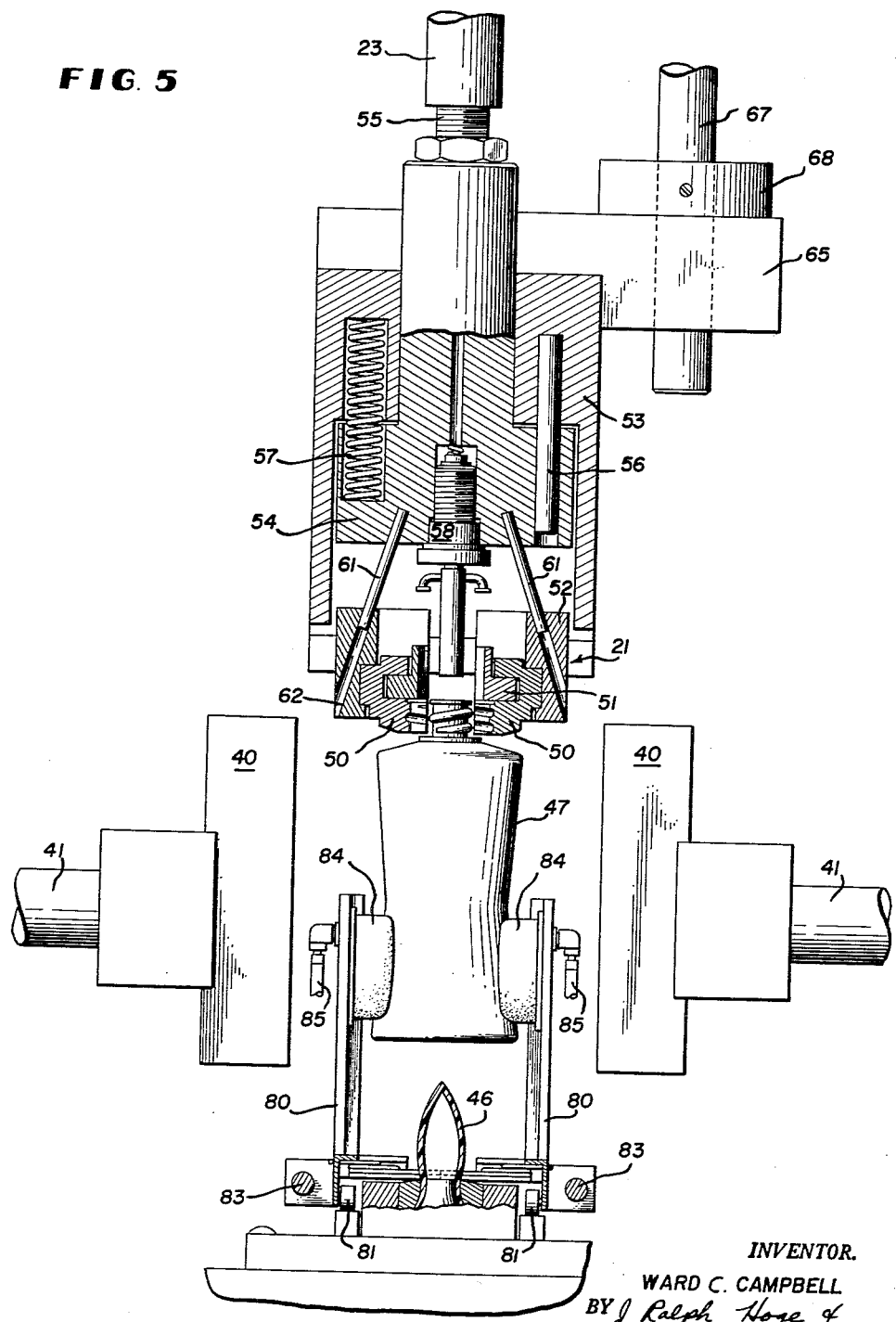
FIGURE 5 is a view similar to FIGURE 4 illustrating final removal of the article from the apparatus by opening the injection mold.

The frame 53 is provided with a laterally projecting guide boss 65 slideably receiving a guide rod 67 having an adjustable stop 68 mounted thereon. Initial upward retraction of the actuating rod 23 of the cylinder 24 will elevate the frame 53 and the block 54 as a unit until the guide boss 65 abuts the stop 68. Thereafter, relative movement between the frame 53 and the block 54 will be effected, such relative movement against the compression of spring 57 opening the neck mold sections 50 as illustrated in FIGURE 5 of the drawings.

As best illustrated in FIGURES 3, 4, 7 and 8, the blow-mold sections 40 are each preferably generally cylindrical and are mounted in opposed relation so that they can be closed by actuation of their cylinders 41 upon the tubular formation 45 (FIGURE 2) extruded during initial vertical movement of the injection mold 21. More specifically, the blow-molds are provided with upper recesses 70 conforming to the exterior surfaces of the injection mold sections 50 (FIGURE 3) when the blow-molds are closed, with an inner portion 71 registering with and snugly receiving that portion of the tube 45 immediately adjacent the injection mold and with a main or body cavity 72, these body cavities 72 registering with one another when the blow-molds are closed to define the exterior contour of the finished article.

The bottom of the article is defined by a body cavity bottom wall 73 which is preferably convexo-concave so that the finished article is provided with a slightly concave bottom. The bottom walls 73 terminate in pinching and shearing edges 74, 75, and an inclined outer exterior surface 76 is provided for clearance for a tube waste portion 46 intermediate the finished article 47 and the orifice 20.

Figure 7:
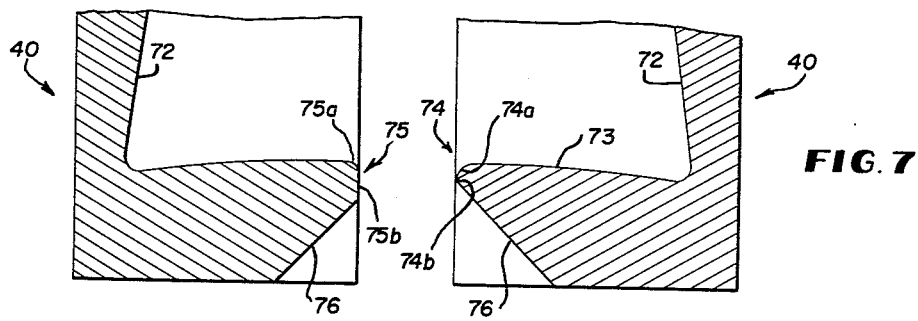
FIGURE 7 is an enlarged fragmentary sectional view of the blow-molds illustrating the pinching and severing portions thereof with the mold sections in opened position.
Figure 8:
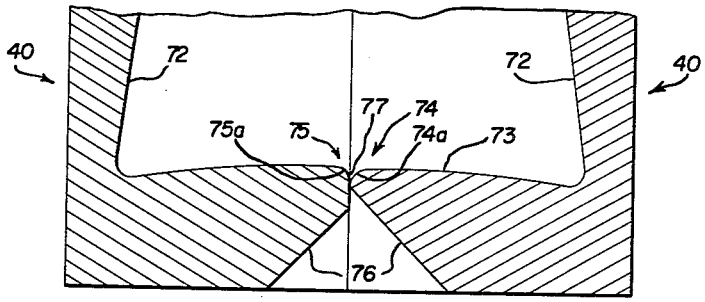
FIGURE 8 is a view similar to FIGURE 7 illustrating the blow-molds in their fully closed position.

As best illustrated in FIGURES 7 and 8 of the drawings, the blow-mold sections 40 are substantially identical with the exception of their mating pinching and severing edges 74, 75. As illustrated in detail in FIGURES 7 and 8, the edge 74 is provided with an upper rounded portion 74a having a definite radius of curvature and terminating in an oblique but sharp cutting edge 74b. The edge 75 of the mating blow-mold half 40 is likewise provided with a rounded upper edge 75a of slightly smaller radius of curvature than the edge 74a and terminating at its lower extremity in a vertical surface 75b, which surface is parallel to the longitudinal axis of the extruded tube 45 which is to be pinched between the edges 74 and 75.

FIGURE 8 shows the relative positions of the edges 74 and 75 when the blow-molds are closed, the tube having been eliminated for clarity of illustration. It will be seen that the oblique cutting edge 74b is aligned with the vertical surface 75b. Thus, the vertical surface 75b serves to support the tube into which the cutting edge 74b is relatively moved upon blow-mold closure. The curved upper extremities 74a and 75a of the edges 74 and 75 define an upwardly outwardly flaring, or conversely downwardly inwardly converging, throat 77 into which the tube adjacent its point of pinch is squeezed during closure of the blow-molds. Thus, the surfaces 74a and 75a cooperate to squeeze the tube closed or to "pinch" the tube closed in a more or less gradual manner above the shearing edge 74b and the reaction surface 75b.

By virtue of the particular design of the pinching and shearing edges 74 and 75, the tube is pinched shut so that the tube, first, is welded together by the surfaces 74a and 75a, and then is substantially completely severed by the cooperating knife edge 74b and the reaction surface 75b beneath the point of welding.

Figure 4:
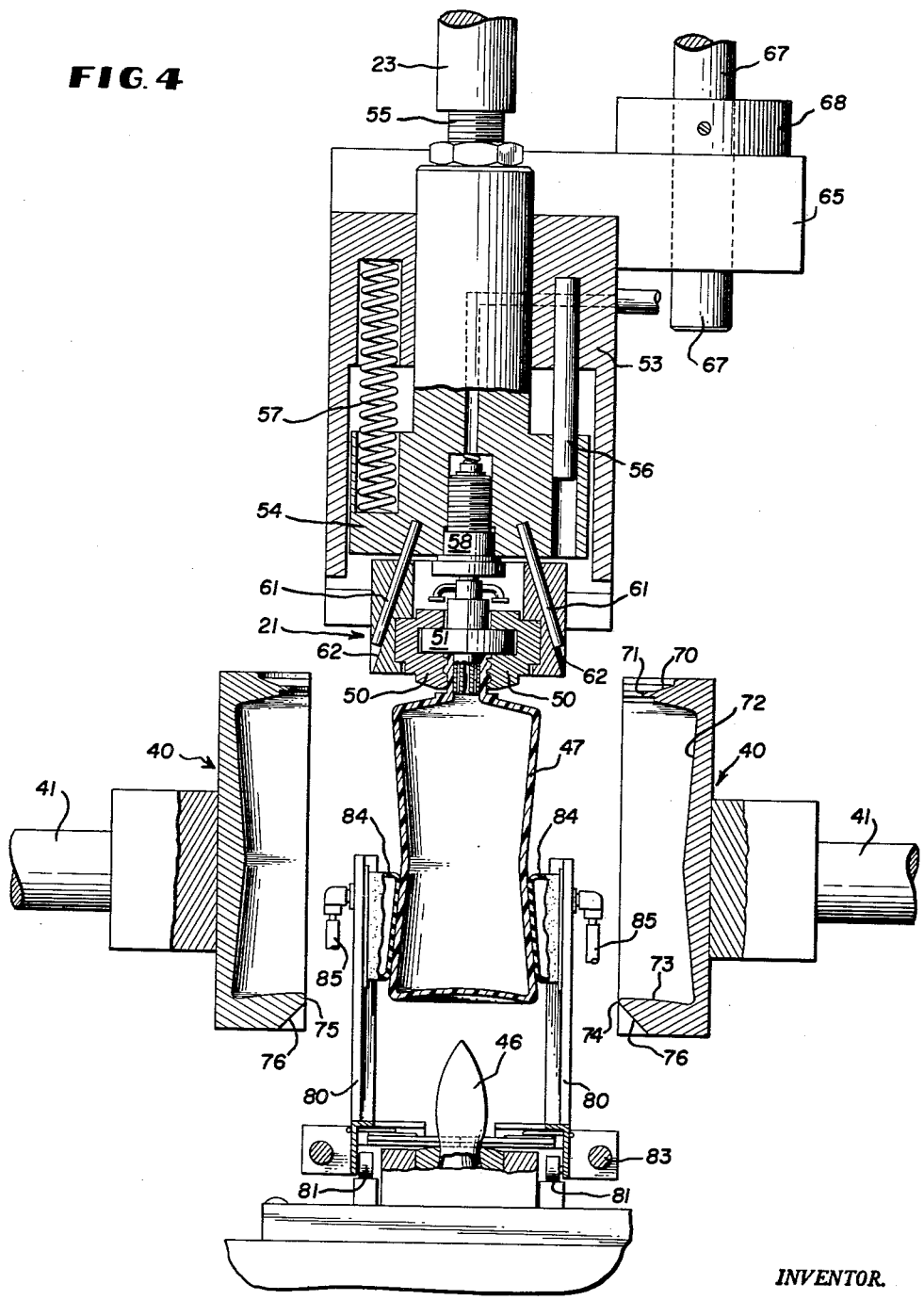
FIGURE 4 is a view similar to FIGURE 3 illustrating the blow-molds open and the finished article moved relative to the orifice to sever the waste portion therefrom.

Once the tube is pinched shut and substantially severed, the tube can be blown by air introduced through the neck mold mandrel 59 into conforming contact with the main cavity portions 72 of the blow-molds 40. The tube is retained within the blow-molds 40 and blowing air is preferably introduced thereinto throughout a period of time sufficient for the article to assume its final configuration and to become self-sustaining. At this time, the blow-molds 40 are opened as illustrated in FIGURE 4 of the drawings. Immediately after opening of the blow-molds 40, the article is retained at its top by the closed neck mold sections 50 and at its bottom by its remaining, although extremely thin, connection to the waste portion 46.

Of course, closure of the blow-mold sections 40 on the tube chills the pinched portion of the tube and this pinched portion is of extremely thin cross-section so that the pinched portion is well solidified.

Next, a take-out device is preferably inserted intermediate the separated blow-mold sections 40. Such a device is illustrated in FIGURES 4 and 5 of the drawings and is also described in detail in the Allen and Elphee application heretofore referred to. Briefly, the take-out mechanism comprises a pair of vertically upstanding side plates 80, surmounting frame members 79 carrying rollers 81, and actuated by fluid-operated cylinders 82 and actuating rods 83 for movement over the row of aligned orifices 20. The side plates 80 carry inflatable article-contacting pads 84, preferably formed of polyurethane foam or similar air-impermeable and inherently resilient material. The pads 84 are inflated to lightly engage the article 47, as by the introduction of fluid under pressure through lines 85.

Next, the actuating piston rod 23 is retracted vertically upwardly, as by release of the holding cylinder 27, to bring the guide embossment 65 of the neck mold carrier frame 53 into abutment with the stop 68 on guide rod 67.

During this vertical movement, the article 47 is displaced upwardly relative to the orifice 20 and such upward displacement is of sufficient magnitude and accomplished under sufficient force to rupture the pinched and all-but-severed portions of the tube 45 interposed between and previously contacted by the pinching edges 74 and 75 of the mold sections 40. Thus, the finished article 47 is torn from the waste portion 46 joined to the orifice 20. Because of the resilient nature of the engagement of the inflatable pads 84 with the article 47, such movement of the article 47 vertically from the orifice 20 can be accomplished even after article take-out engagement has been accomplished.

Next, the actuating rod 23 continues its vertical movement to its final position, such further displacement of the rod 23 after abutment between the stop 68 and the neck mold carrier frame 53 effecting vertical displacement of the neck mold carrier block 54 relative to the frame 53 and lateral opening movement of the neck mold segments 50. Thus, the relative positions of FIGURE 5 are attained and the article 47 is completely released from the forming machine.

Figure 6:
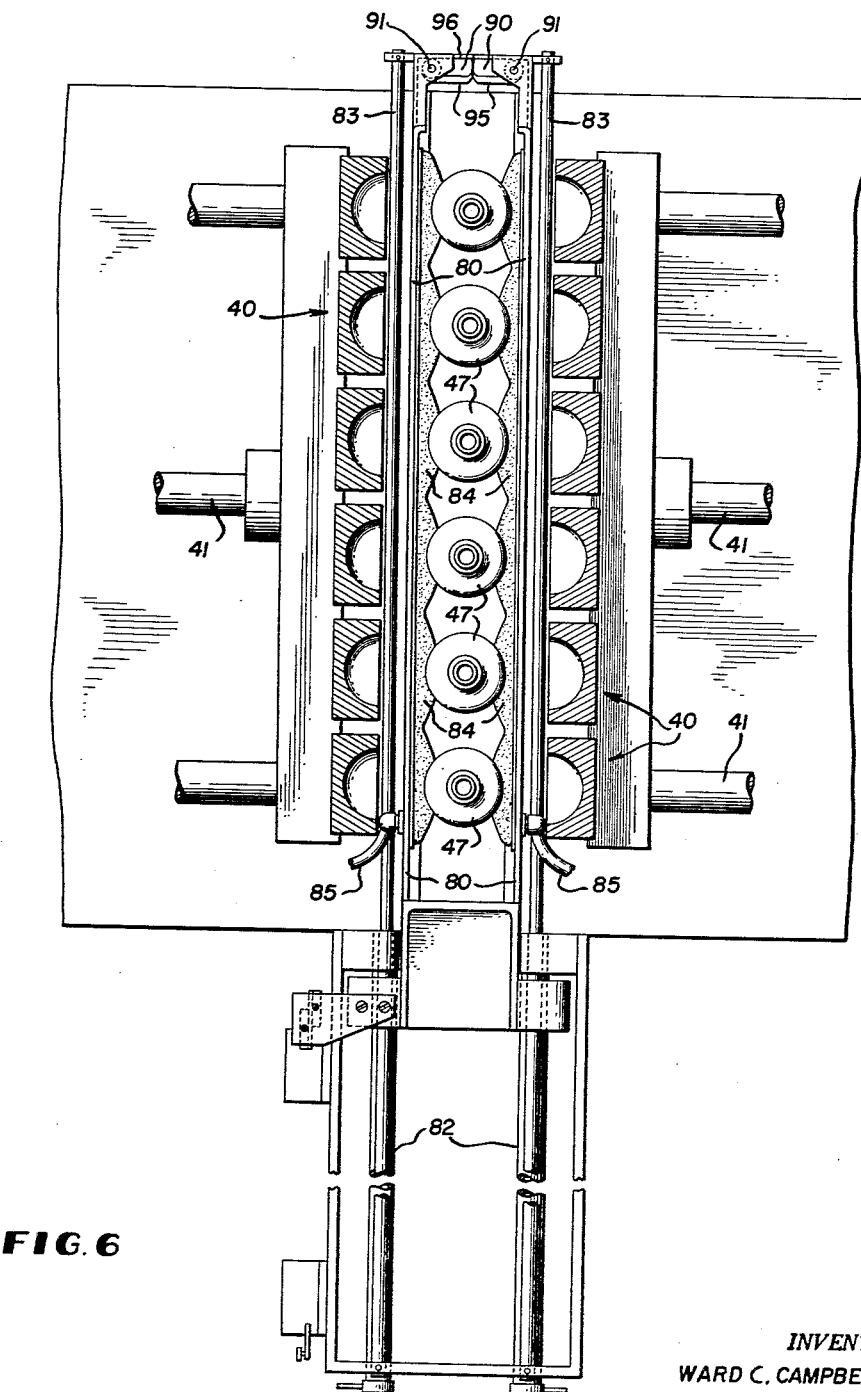
FIGURE 6 is a plan view of the apparatus in its position illustrated in FIGURE 5.
Figure 9:
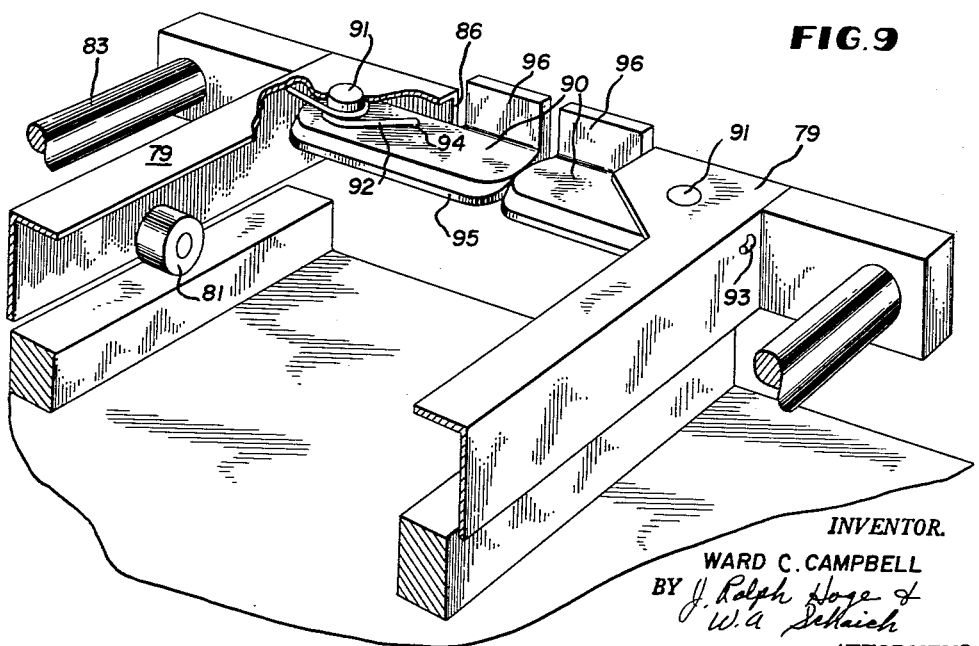
FIGURE 9 is an enlarged fragmentary perspective view illustrating a portion of a take-out apparatus utilizable with the present invention.

The take-out device is then retracted from its position intermediate the opened blow-mold sections 40 to bodily remove the articles from the forming machine. However, the waste portions 46 are still attached to the orifices 20. At the forward end of the take-out (as best illustrated in FIGURES 6 and 9) a pair of shear blades 90 are provided. These blades are connected to the take-out frame elements 79 at the forward extremities thereof, as by pivot pins 91. Disposed on these pins are hair springs 92 anchored at one end to the frame elements, as at 93, and at their other ends to the blades, as at 94. The hair springs accommodate relative pivotal movement of the knives as the take-out is inserted between the opened blow-mold sections 40. However, as the take-out is retracted, the knives strike the adjacent vertical surfaces 86 of the frame elements 79 so as to prevent relative pivotal movement therebetween. The knives 90 are preferably provided with sharpened rearward edges 95 which closely overlie the orifices, as illustrated in FIGURE 4, so that upon return movement the knife edges 95 sever the waste portions 46 from the orifices 20. The knives are also provided at their edges opposite the knife edges 95 with upstanding surfaces 96 which abut the severed waste portions 46 and serve to pull these waste portions from the machine as the take-out is retracted.

Thus, it will be seen that the present invention provides a novel apparatus including a blow-mold comprising separable sections having mating tube-pinching edges effective to pinch shut and substantially completely sever a portion of the tube to be blown from a waste portion of the tube joined to the orifice, together with article-elevating mechanism effective to tear the finished article from the all-but-severed waste portions.

The method of the present invention involves the pinching and substantially complete severing of a tube in spaced relation to an extrusion orifice, followed by blowing of the tube to final configuration and then moving the blown article relative to the orifice to tear the finished article free from the waste portion.

As a result, the article, as removed from the forming apparatus is complete in and of itself and no further finishing operations need be performed thereon.

The embodiments of the invention in which an exclusive property or privilege is claimed, are defined as follows:

1. In an apparatus for making plastic articles and including an annular orifice, an injection mold movable from a first position at the orifice to a second position spaced from the orifice, and means to supply plasticized material to the mold when at its first position to form an injected portion of the article and to extrude a tube of plasticized material during movement of the mold to its second position, the improvements of a blow-mold closable on the extruded tube to pinch the tube shut adjacent the orifice while substantially severing the same, means for blowing the tube to its final article configuration interiorly of the mold, means for opening the mold to expose the final article, and means for moving the injection mold away from the orifice from its second position and in the direction of extrusion to complete severing of the article from the pinched tube portion still joined to the orifice.

2. In a method of making a plastic article wherein a first portion only of the article is injection molded in a mold positioned at an orifice and the first portion is moved axially from the orifice as a tube is extruded therethrough, the steps of enclosing the tube portion intermediate the article first portion and the orifice in a mold having an article-defining cavity, pinching the tube shut and forming a thin web of solidified plastic intermediate the article-defining cavity and the orifice, expanding the tube portion in the mold into a finished article, opening the mold to expose the expanded portion only of the article, moving the first article portion still confined in its mold axially further away from said orifice to rupture the thin web, and then removing the first article portion from its mold, thereby releasing the article.

3. In an apparatus for making plastic articles and including an annular orifice and means to extrude plasticized material through said orifice, the improvements of a blow-mold having cooperable sections closable on the extruded tube, one of said mold sections having its end portion adjacent the orifice provided with an anvil surface parallel to the axis of the tube and the other of said sections having a sharp cutting edge aligned with and cooperable with said anvil surface to pinch the tube shut adjacent the orifice while substantially severing the same, means for blowing the tube to its final article configuration interiorly of the mold, means for opening the mold to expose the final article and means for moving the final article in the direction of extrusion to rupture the pinched tube thereby completely severing the article from the tube portion still joined to the orifice.

4. In a plastic article forming apparatus including an orifice from which a tube is extruded, the improvements of a mold closable on the tube and including complementary tube-contacting anvil and knife edges engageable with the tube in closely spaced relation to the orifice to substantially sever the tube, means for opening and closing the mold, and means to move said tube away from said orifice independently of the mold and after completion of the molding operation to complete severance of said tube.

5. In a method of making a blown plastic article wherein a tube is extruded from an orifice, the steps of simultaneously closing a mold on the tube and pinching the tube shut adjacent the orifice to form a closed tubular formation joined to the orifice through a thin web, inflating the tubular formation in said mold, retaining the inflated tubular formation in the mold to chill the formation and the thin web opening the mold to expose the blown article joined to the orifice only through the chilled thin web, and moving the blown article independently of the mold away from said orifice to rupture the chilled thin web.

6. In a method of making a plastic article wherein a first portion only of the article is injection molded in a mold positioned at an orifice and the first portion is moved axially from the orifice to a remote position as a tube is extruded therethrough, the steps of simultaneously enclosing the tube portion in a mold having an article-defining cavity and substantially severing the tube intermediate the article-defining cavity and the orifice, introducing fluid under pressure into the tube to expand the tube portion into a finished article, opening the mold to expose the article, and moving the first article portion still confined in said mold from said remote position and in a direction axially away from said orifice to rupture the substantially severed tube and to separate the article from the orifice.

7. In an apparatus for making plastic articles and including an annular orifice, an injection mold movable from a first position at the orifice to a second position spaced from the orifice, and means to supply plasticized material to the mold when at its first position to form an injected portion of the article and to extrude a tube of plasticized material during movement of the mold to its second position, the improvements of a blow-mold closeable on the extruded tube and having complementary elongated anvil and cutting edges contacting the tube portion adjacent the orifice to substantially sever the same, means for blowing the tube to its final article configuration interiorly of the mold and above said edges, means for opening the blow-mold to expose the final article and means for moving the injection mold from its second position axially away from the orifice to a position more remote from the orifice, such movement of the injection mold tensioning the substantially severed tube portion to complete severing of the article from the tube portion still joined to the orifice.

8. In a method of making a blown plastic article wherein a tube is extruded from an orifice, the steps of simultaneously enclosing a portion of the tube in a blow-mold and pinching the tube shut between cooperating anvil and cutting edges of the blow mold located in closely spaced relation to the orifice, the pinched portion of said tube being substantially severed by said edges, blowing the tube interiorly of said mold, opening the mold to expose the blown article joined to the orifice through the pinched tube portion, and moving the blown article axially away from said orifice to rupture the substantially severed tube portion.

References Cited in the file of this patent

UNITED STATES PATENTS

| | | |
|---|---|---|
| 2,710,987 | Sherman | June 21, 1955 |
| 2,804,654 | Sherman | Sept. 13, 1957 |
| 2,928,120 | Leghorn et al. | Mar. 15, 1960 |
| 2,936,481 | Wilkalis et al. | May 17, 1960 |
| 2,940,120 | Grebowiec | June 14, 1960 |
| 2,975,473 | Hagen et al. | Mar. 21, 1961 |

FOREIGN PATENTS

| | | |
|---|---|---|
| 203,875 | Australia | Oct. 25, 1956 |